UNITED STATES PATENT OFFICE 2,456,768

POLYFLUORINATED PROPIONITRILES

David W. Chaney, Nether Providence Township, Delaware County, Pa., assignor to American Viscose Corporation, Wilmington, Del., a corporation of Delaware No Drawing. Application June 28, 1946, Serial No. 680,055

5 Claims. (Cl. 260—465.7)

This invention relates to propionic acid derivatives having the general formula $$CXX^1X^2CClX^3R$$

where X, $X^1$, $X^2$, and $X^3$ represent chlorine or fluorine, X, $X^1$, and $X^2$ being the same or different, and R represents an acyl halide group, an acyl ester group, an acyl amide group, or a nitrile group. The derivatives in which R represents an acyl halide group, an acyl ester group, and an acyl amide group are claimed, respectively, in my copending applications Serial Numbers 31,205, 31,204, and 31,206, filed June 4, 1948.

The products are liquids which are useful as such, or as intermediates in various chemical processes. For example, in the specific case, where at least two of X, $X^1$ and $X^2$ are fluorine certain of the products are useful as intermediates for the production of new β-difluorinated acrylonitriles which distinguish over acrylonitrile itself or other mono-olefinic type compounds by the high degree of reactivity which they exhibit toward compounds having a labile hydrogen, such as the primary alcohols. Thus those new acrylonitrile derivatives react spontaneously with the primary alcohols, in the absence of a catalyst and under ordinary temperature and pressure conditions, to form a new series of saturated ethers, via addition to the double bond. The new saturated ethers are in turn useful as solvents, etc., and may be used in various chemical processes, including polymerization processes.

The propionic acid derivatives with which the invention is concerned may be derived from propylenes having the general formula $$CXX^1X^2CX^3=CX^4Cl$$

where X, $X^1$, $X^2$, $X^3$ and $X^4$ represent fluorine or chlorine and X, $X^1$, and $X^2$ are the same or different, by a method involving oxidation of the propylene, under the influence of actinic radiation to produce the corresponding propionyl chloride, or in some cases, both the corresponding acyl chloride and acyl fluoride, which products may be separated from the crude reaction product. The acyl halide may be hydrolyzed to the corresponding acid, which, in the form of its sodium salt is useful as an insecticide, or it may be converted to other derivatives, with or without separation from the crude reaction mixture. For example, either after separation from the reaction mixture, or without such separation, the acyl halides may be converted to corresponding esters or to the amides, which may be separated and used as such, for example as intermediates in various chemical processes, as solvent, etc., or the amides, with or without separation from the crude reaction mix, may be dehydrated to the corresponding nitriles which are in turn, useful for various purposes, as, for instance, in some cases, for the production of the fluorinated acrylonitriles previously mentioned.

Oxidation of the propylene may be effected by passing a stream of oxygen, desirably mixed with a small amount of chlorine gas which serves as a catalyst for the reaction, into a reaction vessel equipped with suitable stirring means and a source of internal actinic radiation, such as a mercury vapor lamp encased in a quartz tube extending into the vessel, the gases being passed in until the propionyl chloride is formed, as indicated by a marked drop in the gas absorption rate, and varying from 50 hours to about 120 hours, depending upon the propylene oxidized and other prevailing conditions such as the efficiency of stirring, the concentration of chlorine, and the intensity of irradiation.

The temperature at which the oxidation is conducted may vary somewhat, depending upon the boiling point of the propylene being oxidized and the solubilities of the gases therein, which decrease with increasing temperature, but is preferably maintained within the range of from about 30° to 80° C., the reaction vessel being externally cooled to dissipate the heat of the actinic radiation source.

The reaction of oxygen with the propylenes of the type under consideration apparently results in the formation of an intermediate oxide of the general formula

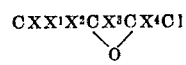

where X, $X^1$, $X^2$, $X^3$, and $X^4$ have the same significance as above, which by rearrangement involving a shift of a halogen atom from one carbon to another, is converted to the corresponding acyl halide. Most unexpectedly, this shift of a halogen atom and rearrangement to form the acid halide takes place, in the case of the propylenes under consideration, not only with respect to chlorine, but under the conditions described herein, with respect to the perhalogenated methyl group. Thus, when 1,1,3-trichloro-2,3,3-trifluoro-propene-1 ($CF_2ClCF=CCl_2$) is oxidized, the oxidation product comprises both the acid chloride ($CF_2ClCFClCOCl$) and the acid fluoride ($CF_2ClCCl_2COF$), the former due to a shift of a chlorine atom, the latter due to a shift of $CF_2Cl$, the rearrangement taking place according to the following scheme:

*First step—Oxidation*

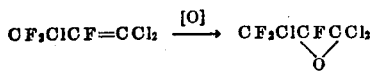

*Second step—Rearrangement*

(1) Shift of chlorine

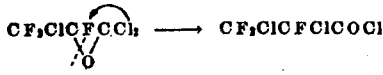

(2) Shift of substituted methyl group

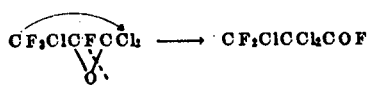

The oxide or mixture of oxides present in the reaction product may be converted to the acyl chloride or mixture of acyl chloride and acyl fluoride by treatment with an amine such as pyridine or, in the case of non-fluorine containing compounds, by treatment with Friedel-Crafts type salts.

Esters may be obtained by refluxing the crude oxidation product with the alcohol corresponding to the ester which it is desired to produce, while the acid amides may be obtained by introducing ammonia into the crude oxidation product.

The following examples in which the parts are by weight will serve to illustrate the invention.

*Example I*

The apparatus used was a three-neck flask equipped with a stirring device, thermometer, gas inlet, reflux condenser, and a source of internal actinic radiation comprising an 80 watt mercury vapor lamp encased in a quartz tube extending into the flask. About 2,785 parts of 1,1,2,3-tetrachloro-3,3-difluoropropene-1, (CF$_2$ClCCl=CCl$_2$)

were placed in the flask and a mixture of oxygen and chlorine in a 10:1 ratio was passed into the flask with constant stirring of the flask contents. The temperature was held at 45–60° C., the flask being cooled by means of running water. At the start, the gases were absorbed at a rate of 50 ml./min. After about 20 hours, the absorption rate had dropped to about 10 ml./min. and the reaction was terminated.

The reaction liquid comprised primarily α-dichlor-β-difluorochloropropionyl chloride, CF$_2$ClCCl$_2$COCL and an oxide believed to be

The acid chloride was converted to the ethyl ester by adding the reaction mixture to about 1600 parts of absolute alcohol, with cooling and stirring, the temperature being maintained at about 30° C. The mixture was allowed to stand for about one hour and then poured into 4,000 parts of water. The products which separated as an oil were washed with dilute sodium bicarbonate, then with water, and after drying over sodium sulfate, were fractionally distilled. About 1,670 parts of the ethyl ester of α-dichloro-β-difluorochloropropionic acid were obtained, B. P. 170–174° C., N$^{24°}$=1.425.

*Example II*

In an apparatus similar to that described in Example I, 1160 parts of 1, 1, 2, 3-tetrachloro-3,3-difluoropropene-1 were photo-oxidized, a mixture of ten parts of gaseous oxygen and one part of chlorine gas being passed into the stirred and internally illuminated contents of the flask at a temperature of 50 to 80° C. The reaction was terminated in about 90 hours. The crude oxidation product obtained was diluted with dry ether, and dry ammonia was passed into the mixture. The reaction was exothermic and the mixture was maintained at a temperature below 20° C. by cooling it with ice water, and continuous stirring. The insoluble ammonium salts which precipitated were filtered off and repeatedly extracted with ether. Upon evaporation of the combined ether filtrate and extracts a sticky solid separated which was dried under vacuum. On distillation under vacuum α-dichloro-β-difluorochloropropionamide (CF$_2$ClCCl$_2$CONH$_2$) was obtained, B. P. 135–148°/29 mm. M. P., 57–58.5° C.

*Example III*

100 parts of the amide described in Example 2, in powdered form, were intimately mixed in a flask with 150 parts of powdered phosphorus pentoxide and the mixture was heated to 150–160° C. in an oil bath. The nitrile was distilled off as it formed. At the end of five hours, the temperature was allowed to rise to 210° C. 84 parts of distillate were collected in a receiver cooled by ice, washed with dilute sodium bicarbonate, then with water, dried over sodium sulfate and distilled. All of the product distilled between 91–95° C. A pure sample of α-dichloro-β-difluorochloropropionitrile had a boiling point of 95° C., freezing point − 32.5° C., and refractive index N$_D^{23°}$=1.3990.

*Example IV*

In an apparatus as described in Example 1, 4730 parts of 1, 1, 3-trichloro-2, 3, 3-trifluoropropene-1 (CF$_2$ClCF=CCl$_2$) were photo-oxidized as described in Example 1 to a mixture consisting primarily of α-chlorofluoro-β-difluorochloropropionyl chloride (CF$_2$ClCFClCOCl), α-dichloro-β-difluorochloropropionyl fluoride (CF$_2$ClCCl$_2$COF), and an oxide believed to be

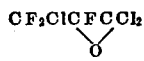

The reaction mixture also comprised some unoxidized starting material, some chlorinated product, and by-products resulting from more complete oxidation and degradation, including COCl$_2$, CO, and CF$_2$ClCOCl. The temperature during the reaction was maintained at about 35° C. The 10 to 1 mixture of gaseous oxygen and chlorine gas was absorbed at the rate of 300 ml/min. When the absorption rate dropped to about 50 ml./min., which required about 30 hours, the reaction was terminated.

The contents of the flask were then slowly heated to about 50° C. to remove dissolved chlorine gas and low-boiling by-products.

The acid halides were converted to the corresponding acid esters in the manner described in Exampe 1, that is by adding the crude reaction liquid to absolute ethanol. After fractional distillation, the pure esters were obtained. The ethyl ester of α-chlorofluoro-β-difluorochloropropionic acid had a boiling point of 142° C., refractive index N$_D^{23°}$ 1.3830, and $d^{23°}$ 1.405. The ethyl ester of α-dichloro-β-difluorochloropropionic acid had a boiling point of about 172.5° C., refractive index $N_D^{23°}$ 1.418 and $d^{23°}$ 1.460.

Instead of ethyl esters, other esters may be obtained by reacting the propionyl halide with the appropriate alcohol, such as methanol, butanol, propanol, etc.

Example V

A crude reaction mixture obtained in accordance with Example IV was diluted with 1500 parts of dry ether, cooled to 10° C., and dry ammonia was passed into the mixture with constant stirring. The reaction between the acid halides and ammonia was exothermic, the temperature being maintained at below 20° C. by external cooling. After about 8 to 10 hours, the acid halides were converted to the corresponding amides and insoluble ammonium halides. The insoluble halides were filtered off, and extracted with ether. The filtrate and ether extracts were combined, and dried, finally under vacuum. 2710 parts of a mixture of amides consisting of α-chlorofluoro-β-difluorochloropropionamide and α-dichloro-β-difluorochloropropionamide were obtained.

Example VI 100 parts of the amides obtained in accordance with the procedure described in Example V, in finely powdered condition were intimately mixed with 150 parts of powdered phosphorus pentoxide in a round-bottom flask. The mixture was heated to 160–180° C. in an oil bath. At that temperature, the product began to distil over. Heating was continued for about four hours, the temperature being finally raised to 200° C. About 76 parts of crude distillate were obtained. The distillate was washed twice with ice water, dried over anhydrous sodium sulfate, and distilled. At 46–56° C., 22 parts of α-chlorofluoro-β-difluorochloropropionitrile ($CF_2ClCFClCN$ distilled over B. P. 51.5° C., $N_D^{23°}=1.3436$, $d^{23°}=1.4360$. At 90–97° C., 20 parts of α-dichloro-β-difluorochloropropionitrile ($CF_2ClCCl_2CN$), were obtained, B. P. 95.5° C., freezing point –33°C., $N_D^{23°}=1.3991$, $d^{23°}=1.5171$.

I claim:

1. α,α-dichloro-β,β-difluoro-β-chloropropionitrile.

2. Nitriles of the formula $CF_2XCClXCN$ where X is selected from the group consisting of chlorine and fluorine.

3. Method for the production of nitriles of the formula $CF_2XCClXCN$, where X is selected from the group consisting of fluorine and chlorine, which comprises oxidizing a propylene of formula $CF_2XCX=CXCl$, where X has the same significance as above, under actinic radiation, to obtain an oxidation product comprising an acyl chloride of formula $CF_2XCXClCOCl$, X having the same significance as above, ammoniating the oxidation product, and dehydrating the resulting acid amide to the nitrile.

4. Method for the production of a nitrile of formula $CF_2ClCCl_2CN$ which comprises oxidizing a propylene of formula $CF_2ClCCl=CCl_2$, under actinic radiation, to obtain an oxidation product comprising the acyl chloride of formula $CF_2ClCCl_2COCl$, ammoniating the oxidation product, and dehydrating the resulting acid amide to the nitrile.

5. Method for the production of nitriles of formula $CF_2ClCFClCN$ and $CF_2ClCCl_2CN$ which comprises oxidizing a propylene of formula $$CF_2ClCF=CCl_2$$

under actinic radiation, to obtain an oxidation product comprising an acyl chloride of formula $CF_2ClCFClCOCl$ and an acyl fluoride of formula $CF_2ClCCl_2COF$, ammoniating the oxidation product, dehydrating the resulting mixed amides to the nitriles, and separating the mixed nitriles.

DAVID W. CHANEY.

REFERENCES CITED

The following references are of record in the file of this patent:

UNITED STATES PATENTS

| Number | Name | Date |
| --- | --- | --- |
| 1,954,867 | Egloff | Apr. 17, 1934 |
| 2,320,034 | D'Ianni | May 25, 1943 |
| 2,379,097 | Miederhauser et al. | June 26, 1945 |
| 2,403,576 | Bradley et al. | July 9, 1946 |
| 2,411,982 | Theobald | Dec. 3, 1946 |
| 2,414,706 | Babcock et al. | Jan. 21, 1947 |

FOREIGN PATENTS

| Number | Country | Date |
| --- | --- | --- |
| 117,464 | Australia | Sept. 16, 1942 |

OTHER REFERENCES

Boeseken, Rec. Trav. Chim., vol. 35, p. 273 (1916).

Boeseken, Rec. Trav. Chim., vol. 46, p. 841 (1927).

Adams et al., Organic Reactions, vol. II (Wiley, 1944), pages 78, 79, 80, 87.

Certificate of Correction

Patent No. 2,456,768.

December 21, 1948.

DAVID W. CHANEY

It is hereby certified that errors appear in the printed specification of the above numbered patent requiring correction as follows:

Column 5, line 48, claim 1, after the syllable and period "trile." insert the following claim:

2. *α-chloro-α-fluoro-β,-difluoro-β-chloropropionitrile.* for the claims now appearing in the patent as "2", "3", "4" and "5", read *3, 4, 5, and 6*, respectively; in the heading to the printed specification, line 9, for "5 Claims" read *6 Claims*;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*